US010328636B2

(12) United States Patent
Versluys et al.

(10) Patent No.: US 10,328,636 B2
(45) Date of Patent: Jun. 25, 2019

(54) ADDITIVE MANUFACTURING QUALITY CONTROL SYSTEMS

(71) Applicant: Hamilton Sundstrand Corporation, Charlotte, NC (US)

(72) Inventors: Kiley J. Versluys, Hartford, CT (US); Diana Giulietti, Tariffville, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 468 days.

(21) Appl. No.: 14/993,546

(22) Filed: Jan. 12, 2016

(65) Prior Publication Data
US 2017/0136695 A1  May 18, 2017

Related U.S. Application Data

(63) Continuation-in-part of application No. 14/940,242, filed on Nov. 13, 2015.

(51) Int. Cl.
| | |
|---|---|
| *B29C 64/20* | (2017.01) |
| *B33Y 10/00* | (2015.01) |
| *B33Y 30/00* | (2015.01) |
| *B33Y 50/02* | (2015.01) |
| *B29C 64/153* | (2017.01) |
| *B29C 64/205* | (2017.01) |
| *B29C 64/214* | (2017.01) |
| *B29C 64/386* | (2017.01) |

(52) U.S. Cl.
CPC ........... *B29C 64/153* (2017.08); *B29C 64/20* (2017.08); *B29C 64/205* (2017.08); *B29C 64/214* (2017.08); *B33Y 10/00* (2014.12); *B33Y 30/00* (2014.12); *B33Y 50/02* (2014.12); *B29C 64/386* (2017.08)

(58) Field of Classification Search
CPC ... B29C 64/188; B29C 64/393; B29C 64/386; B29C 64/214; B29C 64/205
See application file for complete search history.

(56) References Cited

U.S. PATENT DOCUMENTS

| | | |
|---|---|---|
| 7,754,135 B2 | 7/2010 | Abe et al. |
| 8,119,053 B1 | 2/2012 | Bedal et al. |
| 8,372,330 B2 | 2/2013 | El-Siblani et al. |
| | (Continued) | |

FOREIGN PATENT DOCUMENTS

WO  WO-2015103476 A1  7/2015

OTHER PUBLICATIONS

Extended European Search Report, of the European Patent Office, dated Jul. 13, 2017, in corresponding European Patent Application No. 17151008.4.

*Primary Examiner* — Robert J Grun
*Assistant Examiner* — Michael Robinson
(74) *Attorney, Agent, or Firm* — Locke Lord LLP; Daniel J. Fiorello; Joshua L. Jones

(57) ABSTRACT

A method includes receiving torque data of a powder recoater operatively connected to an additive manufacturing system. The torque data includes torque data of the recoater when the recoater traverses a build area. Receiving torque data includes receiving force data from a plurality of load cells, each load cell operatively associated with a blade segment of a recoater blade assembly. The method also includes determining a quality of one or more of an additive manufacturing process and/or product based on the torque data.

14 Claims, 5 Drawing Sheets

(56) References Cited

U.S. PATENT DOCUMENTS

| | | |
|---|---|---|
| 9,067,361 B2 | 6/2015 | El-Siblani |
| 2004/0170765 A1 | 9/2004 | Ederer et al. |
| 2006/0208396 A1 | 9/2006 | Abe et al. |
| 2009/0090259 A1* | 4/2009 | Bras .................. B41F 9/003 101/154 |
| 2014/0117575 A1 | 5/2014 | Kemperle et al. |
| 2014/0159266 A1 | 6/2014 | Bamberg et al. |
| 2014/0255666 A1* | 9/2014 | Stucker ............... B29C 67/0081 428/201 |
| 2015/0024233 A1 | 1/2015 | Gunther |
| 2015/0115490 A1 | 4/2015 | Reinarz |
| 2015/0273583 A1 | 10/2015 | Bumgardner |

* cited by examiner

ADDITIVE MANUFACTURING QUALITY CONTROL SYSTEMS

CROSS-REFERENCE TO RELATED APPLICATIONS

This application claims the benefit, as a continuation-in-part, of U.S. patent application Ser. No. 14/940,242, filed Nov. 13, 2015, the contents of which are incorporated by reference in their entirety.

BACKGROUND

1. Field

The present disclosure relates to additive manufacturing, more specifically to quality control for additive manufacturing devices and processes.

2. Description of Related Art

Part swell puts a recoater at risk for crashing into the part, thus damaging the part or the recoater itself. There is no automatic system for detecting defects before they are irrecoverable. Also, sometimes a powder bed fusion machine experiences incomplete recoats or short feeds. There is currently no system in place to monitor recoat quality or incomplete coverage.

Such conventional methods and systems have generally been considered satisfactory for their intended purpose. However, there is still a need in the art for improved additive manufacturing systems. The present disclosure provides a solution for this need.

SUMMARY

A method includes receiving torque data of a powder recoater operatively connected to an additive manufacturing system. The torque data includes torque data of the recoater when the recoater traverses a build area. Receiving torque data includes receiving force data from a plurality of load cells, each load cell operatively associated with a blade segment of a recoater blade assembly. The method also includes determining a quality of one or more of an additive manufacturing process and/or product based on the torque data.

Determining the quality can include comparing the torque data with reference data to determine whether the torque data is within a predetermined range of the reference data. Determining the quality can include determining if a powder recoat on the build area is incomplete.

The method can include one or more of alerting a user and/or prompting the user to recoat the build area. In certain embodiments, the method can include causing the powder recoater to recoat the build area.

Determining the quality can include determining if an additively manufactured product in the build area has part swell if a predetermined swell torque is received. Determining if an additively manufactured product in the build area has part swell can include determining if the part swell is recoverable part swell or irrecoverable part swell based on received torque data.

In certain embodiments, determining the quality can include correlating the torque data with recoater location data and/or reference build location data for the additively manufactured product, such that the location of one or more specific additively manufactured products can be determined if the one or more of the additively manufactured products has part swell.

If the part swell is determined to be recoverable, the method can include lowering a laser power on and/or at a region of the one or more of the additively manufactured products that have recoverable part swell. If the part swell is determined to be irrecoverable, the method can include alerting a user and/or shutting off a laser power to the additively manufactured products that have irrecoverable part swell.

A non-transitory computer readable medium includes computer readable instructions for a controller that is configured to control an additive manufacturing process, the computer readable instructions including a method or any suitable portion thereof as described above.

A recoater blade assembly can include a shaft, a plurality of collars rotatably disposed around the shaft, each collar including a blade segment rigidly connected to the collar, and a plurality of load cells that are configured to sense force between the shaft and the collars. Each load cell can be disposed between a collar flange and a shaft flange.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
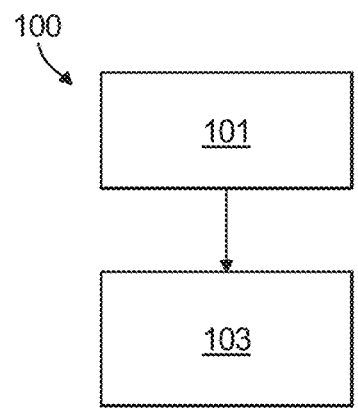
FIG. 1 is a flow chart of an embodiment of a method in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIGS. 2-6. The systems and methods described herein can be used to monitor a quality in real time or after the fact of an additive manufacturing process and/or product thereof.

Figure 2:
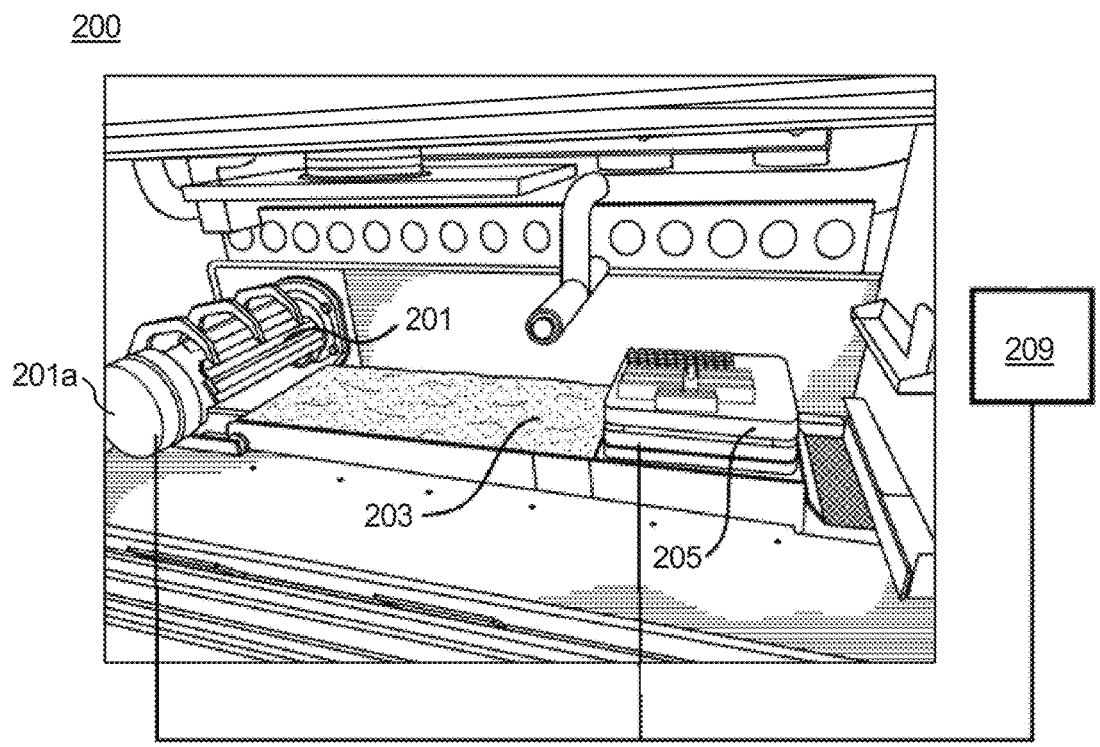
FIG. 2 is a perspective view of an embodiment of a system in accordance with this disclosure.

Referring to FIGS. 1 and 2, a method 100 includes receiving torque data 101 of a powder recoater 201 operatively connected to an additive manufacturing system 200. The powder recoater 201 includes a roller 201a for leveling/compacting powder which rotates relative to the powder bed 203. As is appreciated by those having ordinary skill in the art, the recoater 201 is configured to sweep powder (e.g., by translating from left to right in the embodiment shown in FIG. 2) from the powder bed 203, push it onto a build area 205 (shown in a fully lifted position), and roll over the deposited powder with the roller 201 to coat the build area 205 with a layer of powder of a predetermined thickness. A controller 209 can receive the torque data and control the recoater 201 and/or any other suitable component of system 200.

The torque data can be obtained via any suitable source (e.g., a torque sensor placed on the roller of the recoater 201) and/or can be calculated from motor speed and/or input power. The torque data includes torque data of the recoater 201 when the recoater 201 traverses the build area 205.

The method also includes determining a quality 103 of one or more of an additive manufacturing process and/or product based on the torque data. Determining the quality 103 can include comparing the torque data with reference data to determine whether the torque data is within a predetermined range of the reference data. For example, known thresholds for normal operations (e.g., proper coating, no part swell) can be set or determined.

Figure 3:
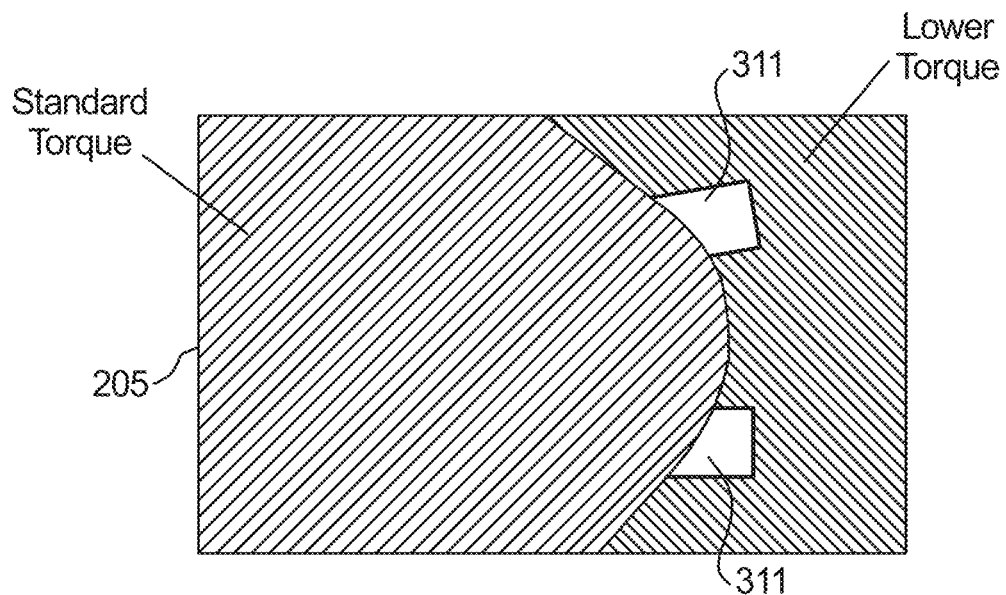
FIG. 3 is a plan view of an embodiment of a build area in accordance with this disclosure, showing an incomplete recoat such that portions of additively manufactured products are exposed.

Referring to FIG. 3, determining the quality 103 can include determining if a powder recoat on the build area 205 is incomplete. Torque values under a minimum threshold can indicate incomplete coating (e.g., short feed such that a product 311 is exposed, insufficient layer thickness), for example. In such a case, the method 100 can include one or more of alerting a user and/or prompting the user to recoat the build area and/or that there is insufficient powder, for example. In certain embodiments, the method 100 can include causing the powder recoater 201 to recoat the build area 205 (e.g., via controller 209).

Figure 4:
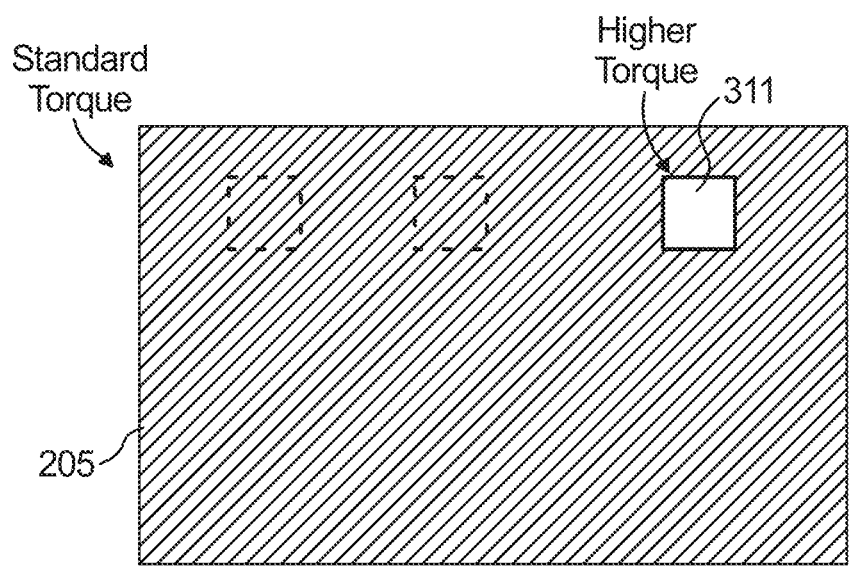
FIG. 4 is a plan view of an embodiment of a build area in accordance with this disclosure, showing part swell such that an additively manufactured product are exposed above the recoated powder layer.
Figure 5A:
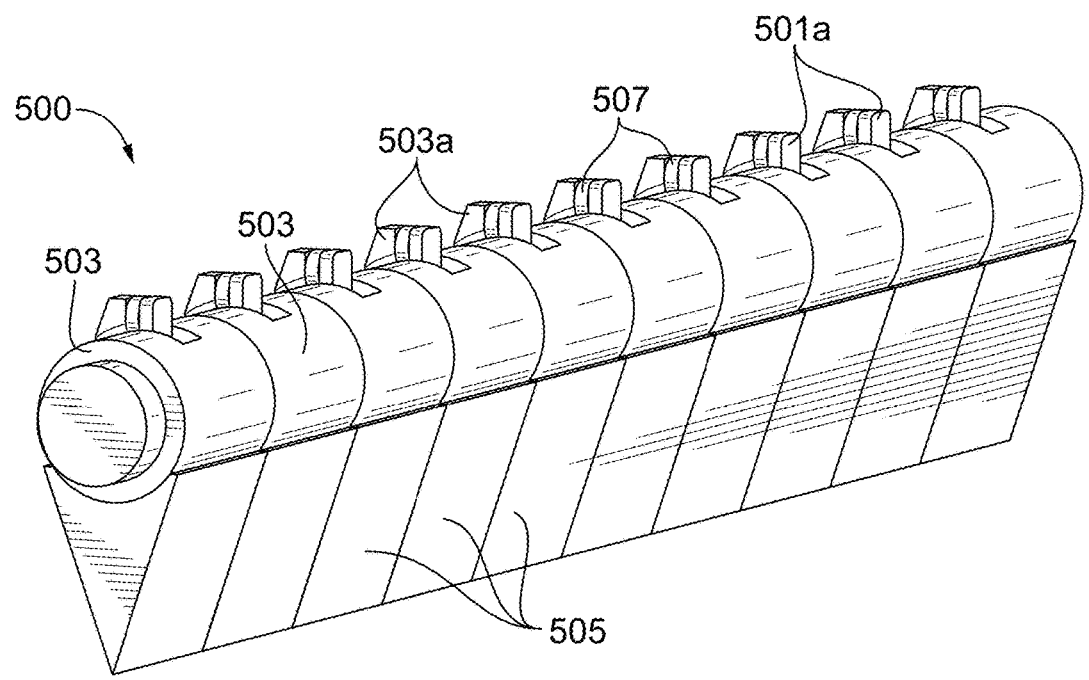
FIG. 5A is a perspective view of an embodiment of a recoater blade assembly in accordance with this disclosure, shown having segments.
Figure 5B:
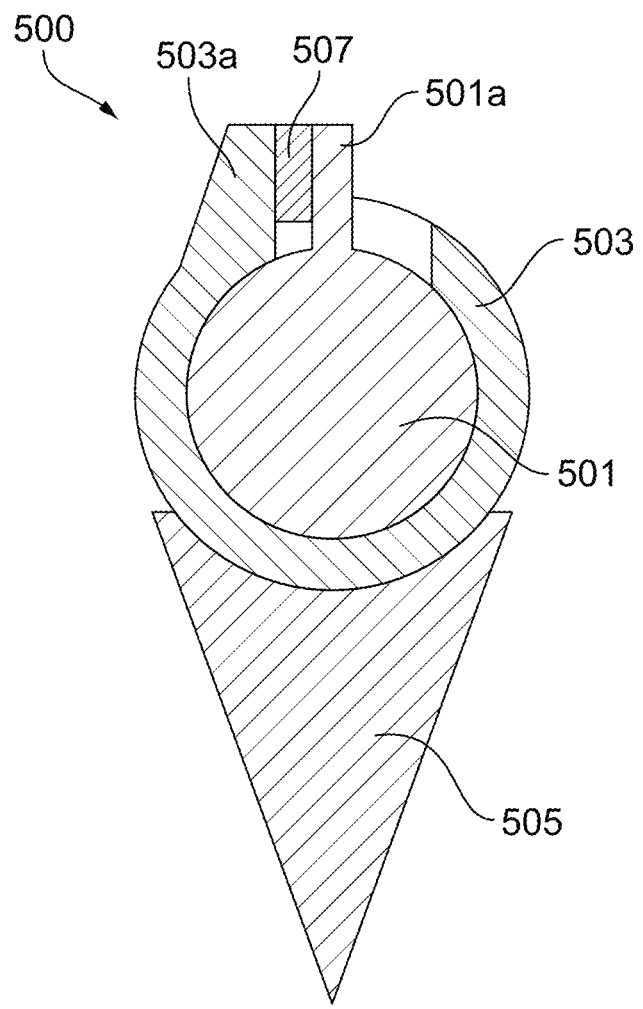
FIG. 5B is a cross-sectional elevation view of the recoater blade assembly of FIG. 5A.

Referring to FIG. 4, determining the quality 103 can include determining if an additively manufactured product 311 in the build area 205 has part swell if a predetermined swell torque is received. Torque values above a maximum threshold can indicate part swell (e.g., because the recoater pushes against the swollen part that protrudes from the powder as shown in FIG. 4). In certain embodiments, determining the quality 103 can include correlating the torque data with recoater location data and/or reference build location data for the additively manufactured product 311, such that the location of one or more specific additively manufactured products 311 can be determined if the one or more of the additively manufactured products 311 has part swell.

Determining if an additively manufactured product 311 in the build area 205 has part swell can include determining if the part swell is recoverable part swell or irrecoverable part swell based on received torque data. If the part swell is determined to be recoverable, the method 100 can include lowering a laser power on and/or at a region of the one or more of the additively manufactured products 311 that have recoverable part swell. If the part swell is determined to be irrecoverable, the method 100 can include alerting a user and/or shutting off a laser power to the additively manufactured products 311 that have irrecoverable part swell.

A non-transitory computer readable medium includes computer readable instructions for a controller 209 that is configured to control an additive manufacturing process. The computer readable instructions include a method 100 or any suitable portion thereof as described above.

As described above, sensing torque on the roller of recoater 201 allows for detection of abnormalities in-process which can help avoid a build crash or other process error. Also, the controller 209 can be configured to react to such detection of abnormalities and can either automatically stop, continue, or modify the build process in any suitable manner. Such torque monitoring is less complicated and less expensive than existing forms of process monitoring.

While recoater 201 is shown including both a roller 201a and a continuous recoater shield (e.g., as shown in on a front portion of the recoater 201), it is contemplated that any suitable recoater assembly can be utilized (e.g., a recoater having a blade instead of a roller). For example, referring to FIGS. 5A and 5B, an embodiment of a recoater blade assembly 500 includes a shaft 501 and a plurality of collars 503 rotatably disposed around the shaft 501, each collar 503 including a blade segment 505 rigidly connected to the collar 503. The shaft 501 can be fixed relative to the recoater 201 such that only the collar 503 and blade segment 505 can move relative to the recoater 201.

The recoater blade assembly 500 also includes a plurality of load cells 507 that are configured to sense force between the shaft and the collars. For example, each load cell 507 can be disposed between a collar flange 503a and a shaft flange 501a. It is contemplated that one or more of the load cells 507 can operate to sense compression and/or tension between the collar flange 503a and the shaft flange 501a.

Figure 6:
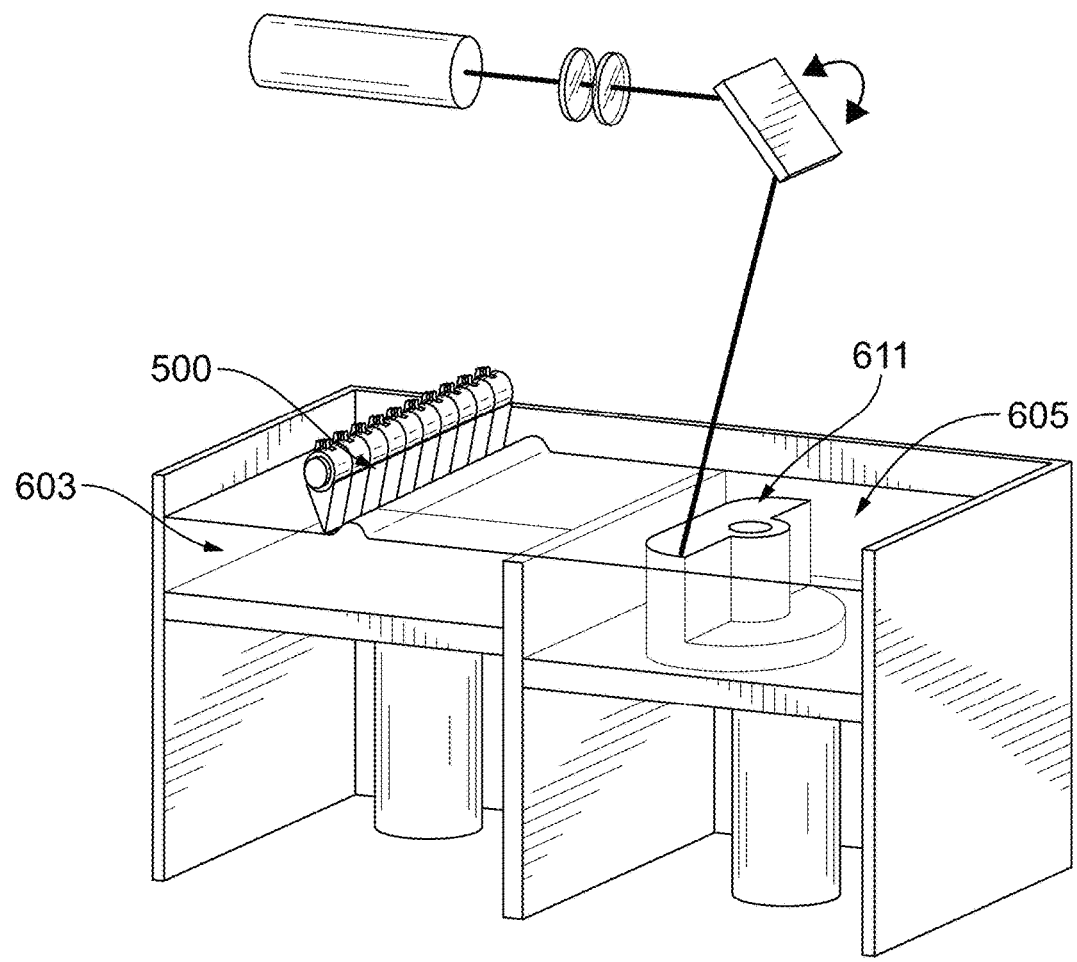
FIG. 6 is a perspective schematic view of an embodiment of an additively manufacturing system in accordance with this disclosure.

Using a recoater blade assembly 500 as described above, receiving torque data (e.g., at block 101) can include receiving force data from a plurality of load cells 507, each load cell 507 operatively associated with a blade segment 505 of a recoater blade assembly 500. Referring additionally to FIG. 6, utilizing a segmented the recoater blade assembly 500 as shown allows variable detection of build abnormalities along the length of the recoater blade assembly 500 which allows location determination on a two dimensional axis when correlated with translation position of the recoater blade assembly 500 across the powder bed 603 or build area 605.

For example, as the recoater blade assembly 500 traverses the build area 605, if powder short feeding or part swell of an additively manufactured product 611 occurs, it will register as a difference on the load cell 507 corresponding to the traversing blade segment 505 (e.g., higher force caused by larger drag on the blade segment 505). Using this data, the location on the build area 605 can be determined with X-Y coordinates (e.g., X coordinates determined by translation position of the recoater 500 and Y coordinates determined by forces on load sensors 507). This can allow more accurate closed loop control to quickly identify and/or remedy quality issues as they accumulate in a build.

The methods and systems of the present disclosure, as described above and shown in the drawings, provide for additive manufacturing systems and methods with superior properties including improved quality control. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method, comprising:
   receiving torque data of a powder recoater operatively connected to an additive manufacturing system, wherein the torque data includes torque data of the recoater when the recoater traverses a build area, wherein receiving torque data includes receiving force data from a plurality of load cells, each load cell operatively associated with a blade segment of a recoater blade assembly; and determining a quality of one or more of an additive manufacturing process and/or product based on the torque data determining the quality includes comparing the torque data with reference data to determine whether the torque data is within a predetermined range of the reference data, and causing the power recoater to recoat the build area.

2. The method of claim 1, wherein determining the quality includes determining if a powder recoat on the build area is incomplete.

3. The method of claim 2, further comprising one or more of alerting a user and/or prompting the user to recoat the build area.

4. The method of claim 1, wherein determining the quality includes determining if an additively manufactured product in the build area has part swell if a predetermined swell torque is received.

5. The method of claim 4, wherein determining if an additively manufactured product in the build area has part swell further includes determining if the part swell is recoverable part swell or irrecoverable part swell based on received torque data.

6. The method of claim 5, wherein determining the quality includes correlating the torque data with recoater location data and/or reference build location data for the additively manufactured product, such that the location of one or more specific additively manufactured products can be determined if the one or more of the additively manufactured products has part swell.

7. The method of claim 6, wherein if the part swell is determined to be recoverable, the method further includes lowering a laser power on and/or at a region of the one or more of the additively manufactured products that have recoverable part swell.

8. The method of claim 6, wherein if the part swell is determined to be irrecoverable, the method further includes alerting a user and/or shutting off a laser power to the additively manufactured products that have irrecoverable part swell.

9. A non-transitory computer readable medium, comprising computer readable instructions for a controller that is configured to control an additive manufacturing process, the computer readable instructions including:

receiving torque data of a powder recoater operatively connected to an additive manufacturing system, wherein the torque data includes torque data of the recoater when the recoater traverses a build area, wherein receiving torque data includes receiving force data from a plurality of load cells, each load cell operatively associated with a blade segment of a recoater blade assembly; and determining a quality of one or more of an additive manufacturing process and/or product based on the torque data, wherein determining the quality includes comparing the torque data with reference data to determine whether the torque data is within a predetermined range of the reference data;

and causing the powder recoater to recoat the build area.

10. The non-transitory computer readable medium of claim 9, wherein determining the quality includes determining if a powder recoat on the build area is incomplete.

11. The non-transitory computer readable medium of claim 10, wherein the computer readable instructions further include one or more of alerting a user and/or prompting the user to recoat the build area.

12. The non-transitory computer readable medium of claim 9, wherein determining the quality includes determining if an additively manufactured product in the build area has part swell if a predetermined swell torque is received.

13. The non-transitory computer readable medium of claim 12, wherein determining if an additively manufactured product in the build area has part swell further includes determining if the part swell is recoverable part swell or irrecoverable part swell based on received torque data.

14. The non-transitory computer readable medium of claim 13, wherein determining the quality includes correlating the torque data with recoater location data and/or reference build location data for the additively manufactured product, such that the location of one or more specific additively manufactured products can be determined if the one or more of the additively manufactured products has part swell.

\* \* \* \* \*